(12) United States Patent
Xu et al.

(10) Patent No.: US 10,940,547 B2
(45) Date of Patent: Mar. 9, 2021

(54) FLASH REMOVAL DEVICE

(71) Applicant: CITIC DICASTAL CO., LTD, Hebei (CN)

(72) Inventors: Zuo Xu, Hebei (CN); Weidong Liu, Hebei (CN); Fengyan Liu, Hebei (CN)

(73) Assignee: CITIC DICASTAL CO., LTD, Qinhuangdao (CN)

( * ) Notice: Subject to any disclaimer, the term of this patent is extended or adjusted under 35 U.S.C. 154(b) by 0 days.

(21) Appl. No.: 16/582,005

(22) Filed: Sep. 25, 2019

(65) Prior Publication Data

US 2020/0139506 A1   May 7, 2020

(30) Foreign Application Priority Data

Nov. 2, 2018   (CN) .......................... 201811298012.1

(51) Int. Cl.
   *B23C 3/04*        (2006.01)
(52) U.S. Cl.
   CPC .......... *B23C 3/04* (2013.01); *B23C 2215/085* (2013.01)

(58) Field of Classification Search
   CPC ..... B23C 3/122; B23C 2215/085; B23C 3/02; B23C 3/04
   See application file for complete search history.

(56) References Cited

U.S. PATENT DOCUMENTS

| 10,610,989 | B1 * | 4/2020 | Liu | .................. B23Q 3/062 |
| 2014/0271016 | A1 * | 9/2014 | Chou | .................. B23B 31/19 409/224 |
| 2017/0129023 | A1 * | 5/2017 | Su | ........................ B23C 3/12 |

* cited by examiner

*Primary Examiner* — Alan Snyder
(74) *Attorney, Agent, or Firm* — Cooper Legal Group, LLC

(57) ABSTRACT

A flash removal device includes a frame, a first servo motor, a bottom plate, an adapter shaft, a shaft sleeve, a radial bearing, a lower end cover, a pedestal, a pressure bearing, a base, a clamping cylinder, connecting plates, first guide rail sliding seats, first linear guide rails, mounting racks, rotary press-down cylinders, first sleeves, first bearings, first rotating shafts, a first gland, clamping rollers, etc. The flash removal device can meet the requirements of flash removal from a wheel blank, has the characteristics of simple structure, stable detection performance, high positioning precision, simple operation and the like, and is very suitable for automatic batch production.

2 Claims, 2 Drawing Sheets

FLASH REMOVAL DEVICE

CROSS REFERENCE TO RELATED APPLICATION

This application claims priority to Chinese Patent Application No. 201811298012.1, entitled "FLASH REMOVAL DEVICE" and filed on Nov. 2, 2018, which is incorporated herein by reference for all purposes.

FIELD OF THE INVENTION

The present invention relates to a wheel blank pre-machining device, in particular to a device for removing flashes on an automatic line before machining of a wheel.

BACKGROUND OF THE INVENTION

At present, there are three molding processes in production of aluminum alloy wheels, i.e., casting, forging and spinning. The spinning process is popularized in more and more enterprises due to its better operability. However, in the blank molding process, large flashes at the closing positions of four side molds have a great impact on wheel machining tools and a great influence on the machining quality of wheels, and shorten the service lives of the tools. The conventional method depends on manual removal, which is not only labor-intensive but also inefficient. The present invention introduces an automatic flash removal device, which can effectively remove flashes of a wheel blank.

SUMMARY OF THE INVENTION

The present invention is directed to provide a flash removal device.

In order to achieve the above objective, the technical solution of the present invention is, a flash removal device, comprises a frame, a first servo motor, a bottom plate, an adapter shaft, a shaft sleeve, a radial bearing, a lower end cover, a pedestal, a pressure bearing, a base, a clamping cylinder, connecting plates, first guide rail sliding seats, first linear guide rails, mounting racks, rotary press-down cylinders, first sleeves, first bearings, first rotating shafts, a first gland, clamping rollers, claws, guide rails, a second sleeve, a second gland, a second bearing, a shaft, a gear, a first driven pulley, a first driving pulley, a first bracket, a motor bracket, a second servo motor, a first lead screw, a second linear guide rail, a second guide rail sliding seat, a first carriage, a first lead screw nut, a second bracket, a second carriage, a third linear guide rail, a third bracket, a third guide slide sliding seat, a second lead screw, a second lead screw nut, a support, a second driven pulley, a third servo motor, a second driving pulley, limit rollers, racks, a third driven pulley, a third sleeve, a third bearing, a second rotating shaft, a third gland, flash milling tools, a third driving pulley, and a fourth servo motor.

The first servo motor, the pedestal and the shaft sleeve are mounted on the frame through the bottom plate; an output shaft of the first servo motor is connected to the base through the adapter shaft; the radial bearing is connected to the shaft sleeve and the base respectively and enclosed in the shaft sleeve and the base by the lower end cover; the pressure bearing is mounted on the base and connected to the base. Through the pressure bearing and the radial bearing, the first servo motor can drive the base to rotate around the axis of the radial bearing with high precision.

The guide rail, the clamping cylinder, the first linear guide rail and the second sleeve are mounted on the base; the second bearing and the shaft are enclosed in the second sleeve through the second gland, and the gear is mounted at an upper end of the shaft. Left and right clamping execution structures are symmetrically mounted on the base, where the mounting rack is connected to the first linear guide rail through the first guide rail sliding seat and the connecting plate; one side of the rack is fixed on the mounting rack, and the other side is engaged with the gear; the first sleeve is fixed on the mounting rack, the first bearing and the first rotating shaft are enclosed inside the first sleeve through the first gland, and the clamping roller is mounted at an upper end of the first rotating shaft; each of the left and right clamping execution structures comprises two clamping rollers distributed symmetrically; and an output shaft of the clamping cylinder is connected to the left mounting rack. The limit rollers are mounted on the frame and connected to the racks. Through a synchronization mechanism of the racks and the gear, the clamping cylinder can drive the bilaterally symmetric clamping execution structures to move synchronously horizontally along the first linear guide rails to clamp and release a wheel with high precision.

The second linear guide rail, the first bracket, the second bracket and the motor bracket are mounted on the second carriage; the second servo motor is mounted on the motor bracket; the first carriage is connected with the second linear guide rail through the second guide rail sliding seat; the first lead screw is mounted on the second carriage through the first bracket and the second bracket, and one end of the first lead screw is connected with the first driven pulley; an output shaft of the second servo motor is connected with the first driving pulley; the first lead screw nut is mounted on the first carriage, and meshes with the first lead screw. By controlling the steering and the number of revolutions of the second servo motor, the second servo motor can control the vertical movement of the first carriage along the second linear guide rail through a transmission mechanism of synchronous pulleys.

The third linear guide rail, the third bracket, the support and the third servo motor are mounted on the frame; the second carriage is connected to the third linear guide rail through the third guide rail sliding seat; the second lead screw is mounted on the frame through the third bracket and the support, and one end of the second lead screw is connected with the second driven pulley; an output shaft of the third servo motor is connected with the second driving pulley; the second lead screw nut is mounted on the second carriage, and meshes with the second lead screw. By controlling the steering and the number of revolutions of the third servo motor, the third servo motor can control the horizontal movement of the second carriage along the third linear guide rail through the transmission mechanism of synchronous pulleys.

The fourth servo motor and the third sleeve are mounted on the first carriage; the third bearing and the second rotating shaft are enclosed in the third sleeve through the third gland; an output shaft of the fourth servo motor is connected with the third driving pulley; two ends of the second rotating shaft are connected to the third driven pulley and the flash milling tools respectively. Through the pulley transmission mechanism, the fourth servo motor can drive the flash milling tools to rotate at a high speed.

According to the size characteristics of the machined wheel, a data processing system of the device can control the milling tools to move to flash removal positions of the wheel by comprehensively controlling the steering and the number of revolutions of the second servo motor and the third servo motor, and to move according to the trajectory of wheel flashes.

According to a preferred aspect of the flash removal device, two limit rollers are respectively connected to non-toothed sides of the left and right racks such that the racks closely mesh with the gear, and that the left and right clamping execution structures can synchronously clamp and release the wheel to ensure the flash removal accuracy of the wheel.

According to a preferred aspect of the flash removal device, the left and right clamping execution structures each have a set of flash removal mechanism, so the present invention can remove two symmetrical flashes in the wheel blank each time, and effectively solve the problem of low flash removal efficiency.

In actual use, the wheel is transported directly above the device by a transport system, compressed air is introduced, and the clamping cylinder can drive the four uniformly distributed clamping rollers in the left and right symmetric clamping execution structures through the synchronization mechanism of the racks and the gear to move synchronously and concentrically along the first linear guide rails so as to clamp the wheel with high precision. Then, the first servo motor starts to work, and the base and the wheel are driven through the pressure bearing and the radial bearing to rotate around the axis of the radial bearing with high precision, so that the wheel blank rotates to a designated position, and the flashes of the blank are just aligned with the flash milling tools. According to the size characteristics of the machined wheel blank, an operating program in the wheel blank machining process is written in advance, the data processing system of the device can control the milling tools to move to flash removal positions of the wheel by comprehensively controlling the steering and the number of revolutions of the second servo motor and the third servo motor, and to move according to the trajectory of wheel flashes, and the milling tools rotating at a high speed remove the blank flashes. Next, the first servo motor drives the wheel blank to rotate 90 degrees, and then the operation of removing flashes by the milling tools is repeated. So far, the operation of removing flashes from the wheel blank is completed.

The flash removal device can meet the needs of flash removal from a wheel blank, has the characteristics of simple structure, stable detection performance, high positioning precision, simple operation and the like, and is very suitable for automatic batch production.

Figure 1:
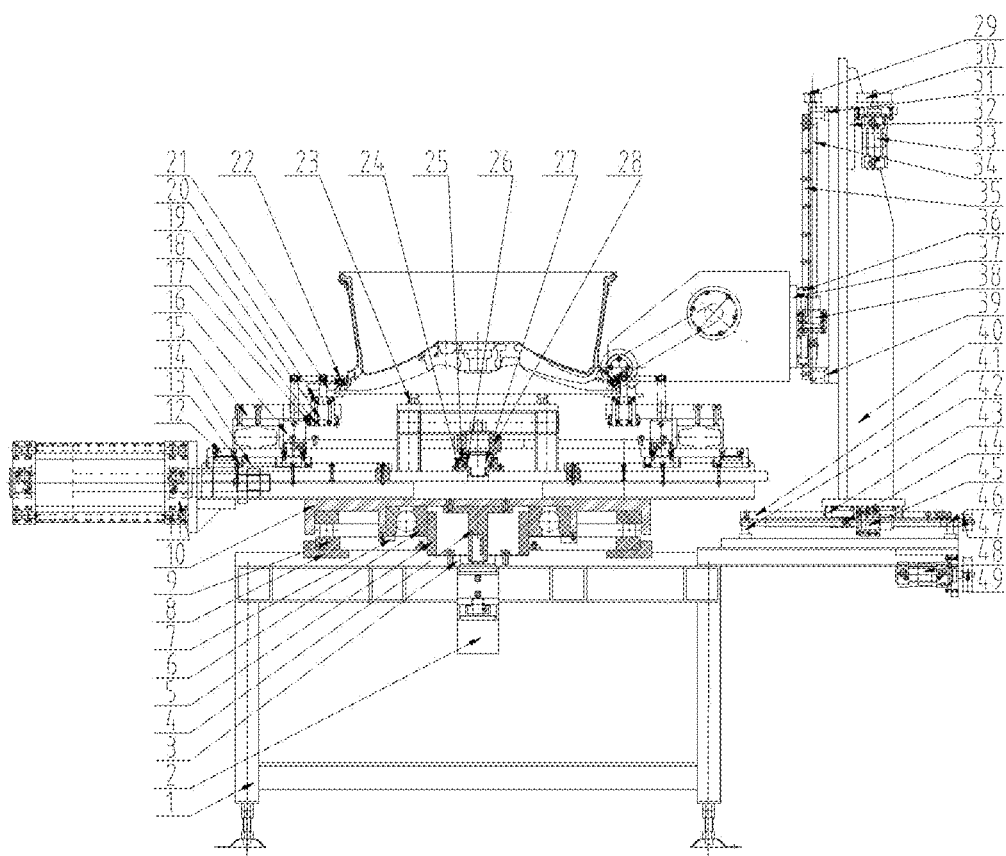
FIG. 1 is a structure diagram of a flash removal device according to the present invention.
Figure 2:
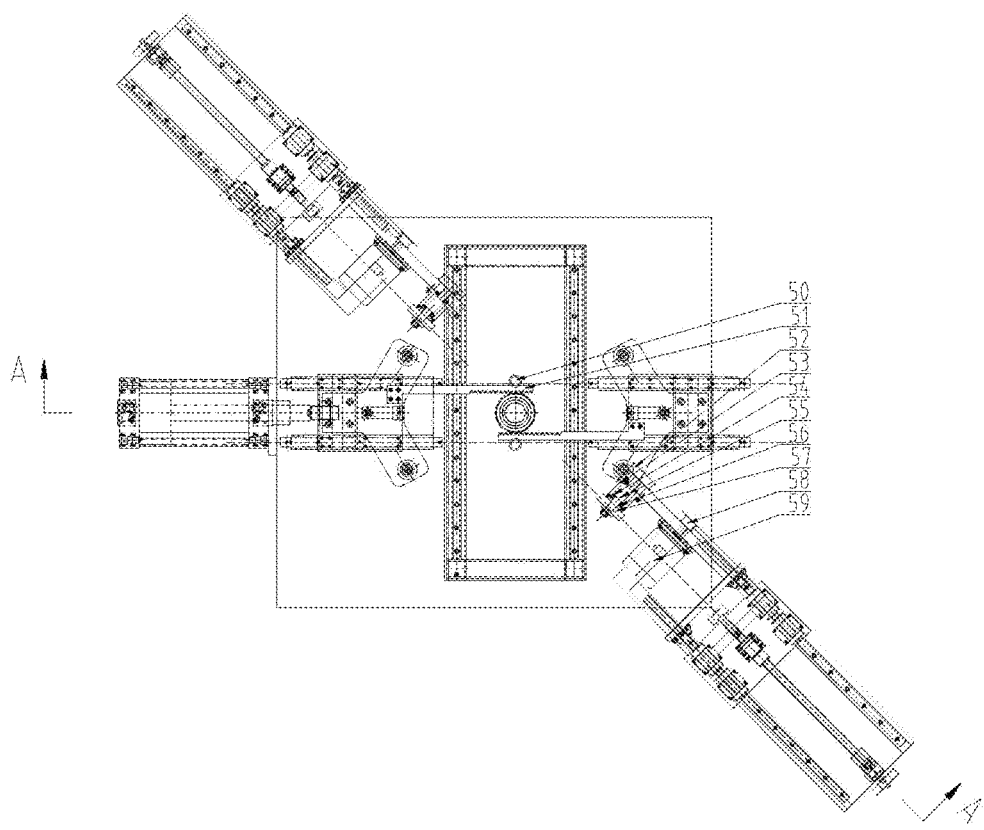
FIG. 2 is a top view of the flash removal device according to the present invention.

In which: 1—frame, 2—first servo motor, 3—bottom plate, 4—adapter shaft, 5—shaft sleeve, 6—radial bearing, 7—lower end cover, 8—pedestal, 9—pressure bearing, 10—base, 11—clamping cylinder, 12—connecting plate, 13—guide rail sliding seat, 14—first linear guide rails, 15—mounting rack, 16—rotary press-down cylinder, 17—first sleeve, 18—first bearing, 19—first rotating shaft, 20—gland A, 21—clamping roller, 22—claw, 23—guide rail, 24—second sleeve, 25—second gland, 26—second bearing, 27—shaft, 28—gear, 29—first driven pulley, 30—first driving pulley, 31—first bracket, 32—motor bracket, 33—second servo motor, 34—lead screw, 35—second linear guide rail, 36—second guide rail sliding seat, 37—first carriage, 38—first lead screw nut, 39—second bracket, 40—second carriage, 41—third linear guide rail, 42—third bracket, 43—third guide slide sliding seat, 44—second lead screw, 45—second lead screw nut, 46—support, 47—second driven pulley, 48—third servo motor, 49—second driving pulley, 50—limit roller, 51—rack, 52—third driven pulley, 53—third sleeve, 54—third bearing, 55—second rotating shaft, 56—third gland, 57—flash milling tool, 58—third driving pulley, 59—fourth servo motor.

DETAILED DESCRIPTION

The details and working conditions of the specific device according to the present invention will be described in detail below in combination with the drawings.

A flash removal device according to the present invention comprises a frame 1, a first servo motor 2, a bottom plate 3, an adapter shaft 4, a shaft sleeve 5, a radial bearing 6, a lower end cover 7, a pedestal 8, a pressure bearing 9, a base 10, a clamping cylinder 11, connecting plates 12, first guide rail sliding seats 13, first linear guide rails 14, mounting racks 15, rotary press-down cylinders 16, first sleeves 17, first bearings 18, first rotating shafts 19, a first gland 20, clamping rollers 21, claws 22, guide rails 23, a second sleeve 24, a second gland 25, a second bearing 26, a shaft 27, a gear 28, a first driven pulley 29, a first driving pulley 30, a first bracket 31, a motor bracket 32, a second servo motor 33, a first lead screw 34, a second linear guide rail 35, a second guide rail sliding seat 36, a first carriage 37, a first lead screw nut 38, a second bracket 39, a second carriage 40, a third linear guide rail 41, a third bracket 42, a third guide slide sliding seat 43, a second lead screw 44, a second lead screw nut 45, a support 46, a second driven pulley 47, a third servo motor 48, a second driving pulley 49, limit rollers 50, racks 51, a third driven pulley 52, a third sleeve 53, a third bearing 54, a second rotating shaft 55, a third gland 56, flash milling tools 57, a third driving pulley 58, and a fourth servo motor 59.

The first servo motor 2, the pedestal 8 and the shaft sleeve 5 are mounted on the frame 1 through the bottom plate 3; an output shaft of the first servo motor 2 is connected to the base 10 through the adapter shaft 4; the radial bearing 6 is connected to the shaft sleeve 5 and the base 10 respectively and enclosed in the shaft sleeve 5 and the base 10 by the lower end cover 7; the pressure bearing 9 is mounted on the base 8 and connected to the base 10. Through the pressure bearing 9 and the radial bearing 6, the first servo motor 2 can drive the base 10 to rotate around the axis of the radial bearing 6 with high precision.

The guide rail 23, the clamping cylinder 11, the first linear guide rail 14 and the second sleeve 24 are mounted on the base 10; the second bearing 26 and the shaft 27 are enclosed in the second sleeve 24 through the second gland 25, and the gear 28 is mounted at an upper end of the shaft 27. Left and right clamping execution structures are symmetrically mounted on the base 10, where the mounting rack 15 is connected to the first linear guide rail 14 through the first guide rail sliding seat 13 and the connecting plate 12. One side of the rack 51 is fixed on the mounting rack 15, and the other side is engaged with the gear 28. The first sleeve 17 is fixed on the mounting rack 15, the first bearing 18 and the first rotating shaft 19 are enclosed inside the first sleeve 17 through the first gland 20, and the clamping roller 21 is mounted at an upper end of the first rotating shaft 19. Each of the left and right clamping execution structures comprises two clamping rollers 21 distributed symmetrically. An output shaft of the clamping cylinder 11 is connected to the left mounting rack 15. The limit rollers 50 are mounted on the frame 1 and connected to the racks 51. Through a synchronization mechanism of the racks 51 and the gear 28, the clamping cylinder 11 can drive the bilaterally symmetric clamping execution structures to move synchronously horizontally along the first linear guide rails 14 to clamp and release a wheel with high precision.

The second linear guide rail 35, the first bracket 31, the second bracket 39 and the motor bracket 32 are mounted on the second carriage 40; the second servo motor 33 is mounted on the motor bracket 32. The first carriage 37 is connected with the second linear guide rail 35 through the second guide rail sliding seat 36. The first lead screw 34 is mounted on the second carriage 40 through the first bracket 31 and the second bracket 39, and one end of the first lead screw 34 is connected with the first driven pulley 29. An output shaft of the second servo motor 33 is connected with the first driving pulley 30. The first lead screw nut 38 is mounted on the first carriage 37, and meshes with the first lead screw 34. By controlling the steering and the number of revolutions of the second servo motor 33, the second servo motor 33 can control the vertical movement of the first carriage 37 along the second linear guide rail 35 through a transmission mechanism of synchronous pulleys.

The third linear guide rail 41, the third bracket 42, the support 46 and the second servo motor 48 are mounted on the frame 1. The second carriage 40 is connected to the third linear guide rail 41 through the third guide rail sliding seat 43. The second lead screw 44 is mounted on the frame 1 through the third bracket 42 and the support 46, and one end of the second lead screw 44 is connected with the second driven pulley 47. An output shaft of the third servo motor 48 is connected with the second driving pulley 49; the second lead screw nut 45 is mounted on the second carriage 40, and meshes with the second lead screw 44. By controlling the steering and the number of revolutions of the third servo motor 48, the third servo motor 48 can control the horizontal movement of the second carriage 40 along the third linear guide rail 41 through the transmission mechanism of synchronous pulleys.

The fourth servo motor 59 and the third sleeve 53 are mounted on the first carriage 37. The third bearing 54 and the second rotating shaft 55 are enclosed in the third sleeve 53 through the third gland 56. An output shaft of the fourth servo motor 59 is connected with the third driving pulley 58; two ends of the second rotating shaft 55 are connected to the third driven pulley 52 and the flash milling tools 57 respectively. Through the pulley transmission mechanism, the fourth servo motor 59 can drive the flash milling tools 57 to rotate at a high speed.

According to the size characteristics of the machined wheel, a data processing system of the device can control the milling tools 57 to move to flash removal positions of the wheel by comprehensively controlling the steering and the number of revolutions of the second servo motor 33 and the third servo motor 48, and to move according to the trajectory of wheel flashes.

According to a preferred aspect of the flash removal device, two limit rollers 50 are respectively connected to non-toothed sides of the left and right racks 51 such that the racks 51 closely mesh with the gear 28, and that the left and right clamping execution structures can synchronously clamp and release the wheel to ensure the flash removal accuracy of the wheel.

According to a preferred aspect of the flash removal device, the left and right clamping execution structures each have a set of flash removal mechanism, so the present invention can remove two symmetrical flashes in the wheel blank each time, and effectively solve the problem of low flash removal efficiency.

In actual use, the wheel is transported directly above the device by a transport system, compressed air is introduced, and the clamping cylinder 11 can drive the four uniformly distributed clamping rollers 21 in the left and right symmetric clamping execution structures through the synchronization mechanism of the racks 51 and the gear 28 to move synchronously and concentrically along the first linear guide rails 14 so as to clamp the wheel with high precision. Then, the first servo motor starts to work, and the base 10 and the wheel are driven through the pressure bearing 9 and the radial bearing 6 to rotate around the axis of the radial bearing 6 with high precision, so that the wheel blank rotates to a designated position, and the flashes of the blank are just aligned with the flash milling tools 57. According to the size characteristics of the machined wheel blank, an operating program in the wheel blank machining process is written in advance, the data processing system of the device can control the milling tools 57 to move to flash removal positions of the wheel by comprehensively controlling the steering and the number of revolutions of the second servo motor 33 and the third servo motor 48, and to move according to the trajectory of wheel flashes, and the milling tools 57 rotating at a high speed remove the blank flashes. Next, the first servo motor drives the wheel blank to rotate 90 degrees, and then the operation of removing flashes by the milling tools 57 is repeated. So far, the operation of removing flashes from the wheel blank is completed.

The invention claimed is:

1. A flash removal device, comprising:
a frame, a first servo motor, a bottom plate, an adapter shaft, a shaft sleeve, a radial bearing, a lower end cover, a pedestal, a pressure bearing, a base, a clamping cylinder, connecting plates, first guide rail sliding seats, first linear guide rails, mounting racks, rotary pressdown cylinders, first sleeves, first bearings, first rotating shafts, first glands, clamping rollers, claws, guide rails, a second sleeve, a second gland, a second bearing, a shaft, a gear, a first driven pulley, a first driving pulley, a first bracket, a motor bracket, a second servo motor, a first lead screw, a second linear guide rail, a second guide rail sliding seat, a first carriage, a first lead screw nut, a second bracket, a second carriage, a third linear guide rail, a third bracket, a third guide rail sliding seat, a second lead screw, a second lead screw nut, a support, a second driven pulley, a third servo motor, a second driving pulley, limit rollers, racks, a third driven pulley, a third sleeve, a third bearing, a second rotating shaft, a third gland, flash milling tools, a third driving pulley, and a fourth servo motor;
wherein the first servo motor, the pedestal and the shaft sleeve are mounted on the frame through the bottom plate; an output shaft of the first servo motor is connected to the base through the adapter shaft; the radial bearing is connected to the shaft sleeve and the base respectively and enclosed in the shaft sleeve and the base by the lower end cover; the pressure bearing is mounted on the base and connected to the base; through the pressure bearing and the radial bearing, the first servo motor is configured to drive the base to rotate around an axis of the radial bearing;
wherein one of the guide rails, the clamping cylinder, one of the first linear guide rails and the second sleeve are mounted on the base; the second bearing and the shaft are enclosed in the second sleeve through the second gland, and the gear is mounted at an upper end of the shaft;

wherein left and right clamping execution structures are symmetrically mounted on the base, where each of the mounting racks is connected to a respective one of the first linear guide rails through one of the first guide rail sliding seats and one of the connecting plates; one side of each of the racks is fixed on a respective one of the mounting racks, and a second side is engaged with the gear;

wherein each of the first sleeves is fixed on the respective one of the mounting racks, one of the first bearings and one of the first rotating shafts are enclosed inside a corresponding one of the first sleeves through a corresponding one of the first glands, and each of the clamping rollers is mounted at an upper end of a respective one of the first rotating shafts; each of the left and right clamping execution structures comprises two of the clamping rollers distributed symmetrically; and an output shaft of the clamping cylinder is connected to one of the mounting racks on left; the limit rollers are mounted on the frame and connected to the racks, through a synchronization mechanism of the racks and the gear, the clamping cylinder is configured to drive the left and right clamping execution structures to move synchronously horizontally along the first linear guide rails to clamp and release a wheel;

wherein the second linear guide rail, the first bracket, the second bracket and the motor bracket are mounted on the second carriage; the second servo motor is mounted on the motor bracket; the first carriage is connected with the second linear guide rail through the second guide rail sliding seat; the first lead screw is mounted on the second carriage through the first bracket and the second bracket, and one end of the first lead screw is connected with the first driven pulley; an output shaft of the second servo motor is connected with the first driving pulley; the first lead screw nut is mounted on the first carriage, and meshes with the first lead screw; by controlling steering and a number of revolutions of the second servo motor, the second servo motor is configured to control vertical movement of the first carriage along the second linear guide rail through a transmission mechanism of synchronous pulleys;

wherein the third linear guide rail, the third bracket, the support and the third servo motor are mounted on the frame; the second carriage is connected to the third linear guide rail through the third guide rail sliding seat; the second lead screw is mounted on the frame through the third bracket and the support, and one end of the second lead screw is connected with the second driven pulley; an output shaft of the third servo motor is connected with the second driving pulley; the second lead screw nut is mounted on the second carriage, and meshes with the second lead screw; by controlling steering and a number of revolutions of the third servo motor, the third servo motor is configured to control horizontal movement of the second carriage along the third linear guide rail through the transmission mechanism of synchronous pulleys; and wherein the fourth servo motor and the third sleeve are mounted on the first carriage; the third bearing and the second rotating shaft are enclosed in the third sleeve through the third gland; an output shaft of the fourth servo motor is connected with the third driving pulley; two ends of the second rotating shaft are connected to the third driven pulley and the flash milling tools respectively; through the transmission mechanism of synchronous pulleys, the fourth servo motor is configured to drive the flash milling tools to rotate.

2. The flash removal device according to claim 1, wherein two of the limit rollers are respectively connected to non-toothed sides of two of the racks on left and right such that the racks mesh with the gear, and that the left and right clamping execution structures are configured to synchronously clamp and release the wheel to ensure flash removal accuracy of the wheel.

* * * * *